Figure 1:
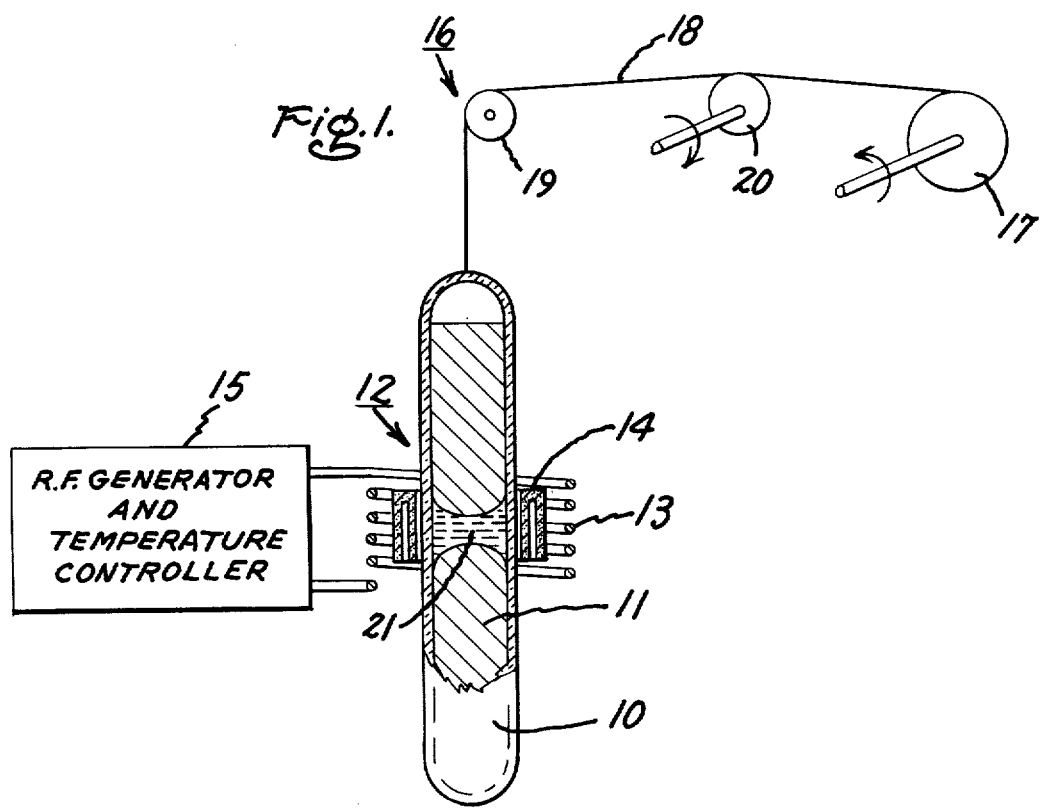

United States Patent

Woodbury et al.

[11] 3,925,108
[45] Dec. 9, 1975

[54] METHOD FOR PREPARING DECOMPOSABLE MATERIALS WITH CONTROLLED RESISTIVITY

[75] Inventors: Henry H. Woodbury, Scotia; Robert S. Lewandowski, Amsterdam, both of N.Y.

[73] Assignee: General Electric Company, Schenectady, N.Y.

[22] Filed: Dec. 26, 1972

[21] Appl. No.: 318,361

Related U.S. Application Data

[63] Continuation of Ser. No. 92,661, Nov. 25, 1970, abandoned.

[52] U.S. Cl. ............... 156/618; 148/12.9; 148/1.5; 75/65 ZM; 252/62.3 GA; 252/62.3 ZT; 23/301; 423/509
[51] Int. Cl. ........................ H01l 7/42; B01j 17/08
[58] Field of Search ......... 148/1.6, 12.9; 75/65 ZM; 252/62.3 GA, 62.3 ZT; 23/301; 423/509

[56] References Cited
UNITED STATES PATENTS

| | | | |
|---|---|---|---|
| 3,030,194 | 4/1962 | Emeis | 75/65 ZM |
| 3,201,227 | 8/1965 | Heumann | 75/65 R |
| 3,318,669 | 5/1967 | Folberth | 148/1.6 X |

OTHER PUBLICATIONS

Kroger et al., J. Electronics, Vol. 1, pp. 190-202 (1955).

*Primary Examiner*—G. Ozaki
*Attorney, Agent, or Firm*—Julius J. Zaskalicky; Joseph T. Cohen; Jerome C. Squillaro

[57] ABSTRACT

A method for preparing readily decomposable materials by a zone melting process wherein an elongated ingot of the material is passed through a localized region of high temperature to cause a molten zone to traverse the elongated ingot from one end to the other. The conductivity type and resistivity of the final ingot is controlled by varying the temperature of the molten zone. The growth of large single crystalline regions is enhanced by introducing a vertical oscillation to the elongated ingot during the last zoning pass.

11 Claims, 2 Drawing Figures

U.S. Patent    Dec. 9, 1975    3,925,108

Inventors:
Henry H. Woodbury,
Robert S. Lewandowski,
by Jerome C. Squillaro
Their Attorney.

METHOD FOR PREPARING DECOMPOSABLE MATERIALS WITH CONTROLLED RESISTIVITY

The invention herein described was made in the course of or under a contract or subcontract thereunder, with the Department of Defense.

This is a continuation of application Ser. No. 92,661, filed Nov. 25, 1970, now abandoned.

The present invention relates to the preparation of readily decomposable materials having volatile consitutents and more particularly to a method for controlling the conductivity type and resistivity along with the size of a single crystalline material.

A particularly advantageous method of preparing homogeneous bodies of readily decomposable materials is described in U.S. Pat. No. 3,201,227 of Frederick K. Heumann. Basically, this method comprises admixing and sealing appropriate proportions of the constituent materials in an evacuated vessel and melting them therein. The melt of the material so produced is then cooled to form a solid body within the evacuated vessel. After cooling, a narrow zone of the solid body is melted and caused to traverse the body from the bottom to the top. The resultant body produced in accord with that invention is substantially homogeneous in composition from one end to the other and found to have substantially the same compositions.

The use of this process for the preparation of high figure of merit thermo-electric materials containing volatile constituents is particularly desirable for producing bodies of decomposable materials having compositional and thermo-electric homogeneity. Compositional materials, such as cadmium telluride (CdTe) are particularly useful in single crystalline form as gamma ray detectors, laser modulators and infrared transmissive windows for carbon dioxide lasers. Such applications require the formation of large single crystalline regions with controlled resistivity and conductivity type. The formation of such large single crystalline regions, however, is exceedingly difficult since grain boundaries and twin-plane defects tend to occur without a known cause. Additionally, the resistivity of the undoped, zone purified ingot produced by this process appeared to have no correlation with the conditions of formation.

It is therefore an object of this invention to provide a method for preparing decomposable materials of selected conductivity type.

It is yet another object of this invention to provide a method for preparing bodies of decomposable materials of selectively variable resistivities.

It is yet another object of this invention to provide a method for increasing the size of single crystalline regions.

It is still a further object of this invention to provide a simplified method for preparing thermo-electric materials in large single crystalline form and with selectively variable conductivity type and resistivity.

Briefly, in accord with one example of this invention, decomposable materials such as cadmium and tellurium are mixed in an evacuated vessel and melted therein. The melt of the material so produced is then permitted to cool. After cooling, the polycrystalline material is removed from the vessel and a suitable amount placed into another vessel which is then passed through a narrow zone of high temperature to cause a molten zone to traverse the elongated body from bottom to top. The temperature of the molten zone is maintained between approximately 1120° and 1,220°C and p-type conducting materials are obtained with a zone temperature of approximately 1,200°C while n-type conducting materials are obtained with zone temperatures of approximately 1,100°C. The growth of large single crystalline regions of cadmium telluride is enhanced by the introduction of a low amplitude, low frequency vertical oscillation to the ingot during the last zone pass.

Figure 2:
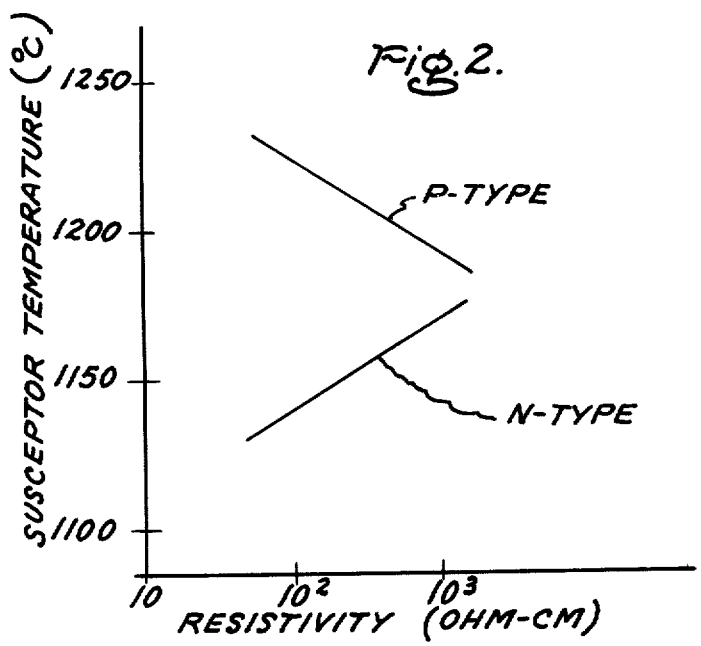

The novel features believed characteristic of the present invention are set forth with particularity in the appended claims. The invention itself, together with further objects and advantages thereof may be best understood by reference to the following description taken in conjunction with the accompanying drawing in which:

FIG. 1 is a diagrammatic sectional view of apparatus suitable for use in the practice of our invention; and FIG. 2 shows the variation of resistivity with temperature for a typical decomposable material.

FIG. 1 illustrates in diagrammatic form, a typical apparatus suitable for carrying out the method of our invention. In particular, the reaction of the materials is carried out in an evacuable vessel of appropriate proportions commensurate with the amount of the constituent materials to be prepared within the vessel. The vessel is preferably of a material capable of withstanding temperatures and pressures encountered in the melting of the constituent materials to be prepared and which does not react therewith. Suitable materials, for example, are quartz, aluminum nitride and graphitized quartz. One method for graphitizing quartz tubing is described below with reference to specific examples for practising our invention.

Appropriate proportions of the constituent materials 11 are placed in a vessel 10 and heated in a localized zone by a narrow furnace 12 comprising, for example, an induction heating coil 13 surrounding the outside of the vessel 10 with a graphite susceptor 14, for example, interposed between the induction coil 13 and the walls of the vessel 10. The graphite susceptor 14 provides means for concentrating the heat from the induction coil 13 in a narrow zone substantially transverse to the vessel 10. The use of the graphite susceptor is particularly desirable when the constituent materials do not provide ample electrical conduction properties to otherwise permit localized zone heating. The furnace 12 comprises an R.F. generator and temperature controller 15 connected to the induction coil 13 for providing temperature control in the localized heating zone.

The vessel 10 is also provided with a suitable positioning mechanism 16 for raising and lowering the vessel 10 at a desired rate through the furnace 12. The positioning mechanism 16 may include, for example, a motor driven reel 17 with a string or cable 18 connected thereto and over a pulley 19 to the vessel 10. The positioning mechanism 16 may also include, for example, means for imparting a vertical oscillation to the vessel 10. FIG. 1 illustrates such a means by the eccentric wheel 20, for example. The positional mechanism 16 therefore permits the vessel 10 to be raised and lowered at a selectively variable rate while being subjected to vertical oscillations of a magnitude and frequency determined by the eccentricity of the wheel 20 and the rotational rate thereof, respectively.

The method of preparing homogeneous bodies of readily decomposable materials with selectively variable conductivities in accord with this invention comprises admixing appropriate proportions of the constituents of the material to be prepared in an evacuable vessel. Typical combinations of constituents may include, for example, cadmium and tellurium, zinc and tellurium, cadmium and selenuim, gallium and arsenic, and cadmium, magnesium and tellurium. The selected constituents are placed in a suitable vessel, for example, which may be made of quartz or other inert materials and which does not react with the melt of the material being prepared. The loaded vessel is evacuated to a pressure, for example, of about $10^{-5}$ Torr. and sealed off under vacuum. The vessel is then heated in a suitable furnace to the melting point of the respective constituents within the vessel. The vessel may be agitated to insure good mixing if desired. The vessel is then removed from the furnace and allowed to cool so as to form a solid body of material which completely fills the cross-section of the vessel. After cooling, the vessel is opened and the resultant crystalline material is removed and broken into small pieces, as needed.

A graphitized quartz vessel is filled with pieces of crystalline material and any desired impurity dopants are added at this time. The vessel is then evacuated to about $10^{-6}$ Torr. and sealed off. The vessel is then slowly lowered through the furnace to produce a narrow localized region 21 of molten material which traverses the body from bottom to top as the vessel is lowered through the furnace. A suitable lowering rate for a particular decomposable material such as cadmium telluride, for example, is in the range of about ¼ to 10 cm./hr. The movement of the molten zone through the material produces a "zoned ingot" having the contour of the vessel.

In accord with one of the novel features of our invention, the resistivity of the zoned ingot is selectively controlled by controlling the temperature of the molten zone. For example, for decomposable materials such as cadmium telluride, molten zone temperatures of approximately 1,220°C produce p-type conductivity bodies of approximately $10^2$ ohm-centimeter resistivity. At molten zone temperatures of approximately 1,120°C, cadmium telluride crystalline bodies exhibit n-type conductivity characteristics having resistivities as low as 50 ohm-centimeters. Intermediate molten zone temperatures produce high resistivity, compensated semiconductor bodies.

Molten zone temperatures are not readily ascertained because it is extremely difficult to measure the temperature of a moving molten zone. The temperature of the susceptor surrounding the vessel and in the region of the molten zone, however, can be more easily measured with a thermocouple, for example. The difference in temperature between that of the susceptor and that of the molten zone itself is believed to be approximately 20°c, that is, the temperature of the molten zone is approximately 20° c less than that of the susceptor.

FIG. 2, therefore, is a plot of susceptor temperature versus resistivity for undoped cadmium telluride in the form of a multiple-zoned ingot. These curves illustrate not only the variation in resistivity with varying susceptor temperatures but also variation in conductivity-type with temperature. The variation in conductivity-type with susceptor temperatures is a characteristic of cadmium telluride but is not necessarily a characteristic of all decomposable materials. Other materials, for example, may only vary in resistivity with temperature. However, our discovery that resistivity, and in some cases conductivity-type, of the resultant material varies with the temperature of the molten zone provides a simple method for preparing decomposable materials of selectively variable resistivity and conductivity-type.

In accord with yet another characteristic feature of our invention, we have discovered that the growth of large crystalline bodies is enhanced by imparting a vertical oscillation to the vessel during the last zoning pass. Typical oscillations range from approximately 2 mm. peak-to-peak amplitude at 2,000 cycles/min. to 5 mm. peak-to-peak amplitude at 15 cycles/min. These vertical oscillations, for example, are introduced by the rotation of the eccentric wheel 20 at the desired rate or by other appropriate means.

Vertical oscillations of frequencies higher than approximately 2,000 cycles/min. and lower than approximately 15 cycles/min. do not appear to produce the desired enhancement of large crystalline growth. The reason that vertical oscillations within the range of approximately 15 cycles/min. to 2,000 cycles/min. tend to produce large single crystalline bodies, i.e., greater than 1 cu.cm. is not fully understood. In fact, why any vertical oscillation imparted to the vessel during the last zoning pass should increase the probability of large single crystalline regions to nearly 100 per cent is not known. It is believed, however, that within the aforementioned range of frequencies the heat flow pattern at the liquid-solid interface adjacent the molten zone or possibly the shape of the liquid-solid interface enhances the growth of large crystalline regions. This belief is supported by the observations that the best single crystalline portions of the ingot, whether oscillated or not, are in the central portions of the ingot and not along the end regions thereof, where the heat flow is known to be different. Whatever the reason, however, the growth of large single crystalline regions is substantially enhanced by imparting a vertical oscillation to the vessel during the last zoning pass of between approximately 15 and 2,000 cycles/min. with peak-to-peak amplitudes of 2 to 5 mm.

The following specific examples are set forth to illustrate the practice of our invention, and are not to be construed in a limiting sense.

EXAMPLE 1

A quartz tube 46 cm. long with an inside diameter of 13 mm. and an outside diameter of 16.2 mm. is cleaned with hydrofluoric acid, rinsed in distilled water and cleaned again in boiling nitric acid and allowed to cool before rinsing again in distilled water. The quartz tube is then graphitized by placing it in a vertical furnace at 1,150°C and evacuated to about $5 \times 10^{-3}$ Torr. After approximately 1 hour, 60 Torr. high purity methane is introduced and then after approximately 10 minutes the tube is evacuated again. This procedure is repeated two more times and then the tube is opened to air after cooling. The walls of the quartz tube are now graphitized.

The graphitized tube is loaded with 100 grams of polycrystalline cadmium telluride. The tube is then evacuated to a pressure of approximately $10^{-6}$ Torr. and then sealed off under vacuum. The tube is then lowered into a vertical furnace to melt down the cadmium telluride crystals into an ingot filling the cross-sectional area of the tube. This is done by starting the lower end of the tube into an 1150°C furnace at a rate of approximately 3.8 cm./hr.

After cooling, the quartz tube is lowered into the narrow zoning furnace at a substantially constant rate of about 2 cm./hr. while the susceptor temperature is maintained at approximately 1150°C. The graphite susceptor is approximately 2.5 cm. long with an inner diameter of approximately 1.6 cm. and an outer diameter of approximately 3.0 cm. Then after all but a small portion of the ingot has passed through the furnace, the lowering mechanism will then raise the ingot back to its original position in a very short time and again start lowering the ingot. This zoning is repeated approximately 10 times. In each instance, a small region of the ingot near the top is not melted to prevent vaporization. The resulting ingot is of n-type conductivity with a resistivity of approximately 200 ohm cm.

EXAMPLE 2

Single crystalline regions of n-type cadmium telluride greater than 1.0 cm.³ are produced in substantially the same manner as described in Example 1, but during the last zoning pass, the ingot is lowered at a rate of approximately 0.5 cm./hr. and a vertical oscillation is imparted to the ingot by the movement of the eccentric wheel. The oscillation is 100 cycles/min. with about 4 mm. peak-to-peak amplitude. The zoning is then stopped and the quartz tube is opened. The cadmium telluride ingot removed therefrom has regions in excess of 1.0 cm.³

EXAMPLE 3

A p-type conductivity crystal of cadmium telluride is produced in substantially the same manner as described in Example 1 except the susceptor temperature is maintained at approximately 1210°C. The resulting ingot is of p-type conductivity with a resistivity of approximately 350 ohm-cm.

EXAMPLE 4

A p-type conductivity crystal of cadmium telluride with a resistivity of approximately 1,000 ohm-cm. is produced in substantially the same manner as described in Example 1 except the susceptor temperature is maintained at approximately 1195°C.

We have described herein, therefore, a new and simplified method of preparing decomposable materials of selected conductivity type and of selectively variable resistivities. Further, by the method of our invention, large size single crystalline regions are produced by introducing a vertical oscillation to the ingot during its last zoning pass.

While the invention has been described herein with respect to specific examples and certain preferred embodiments thereof, many changes and modifications will occur to those skilled in the art. It is therefore to be understood that the appended claims are intended to cover all such modifications and changes as fall within the true spirit and scope of our invention.

What we claim as new and desire to secure by Letters Patent of the United States is:

1. A method of preparing a body of cadmium telluride of predetermined resistivity comprising sealing a quantity of cadmium telluride in an evacuated vessel, melting and cooling said quantity of cadmium telluride within said evacuated vessel to cause the formation of a solid body of said quantity which completely fills the cross section of said vessel while being freely movable therein from the bottom to the top thereof, lowering said sealed evacuated vessel with said solid body therein through a narrow heated zone to cause a narrow molten zone to be formed in said solid body and to traverse said solid body from the bottom to the top thereof, said molten zone being confined between adjacent solid portions of said body and the walls of said vessel, providing said narrow molten zone with heat to maintain the temperature thereof at a predetermined value corresponding to said predetermined resistivity within the range of approximately 1,120°C to 1,220°C, whereby said quantity of cadmium telluride is formed into a body of said predetermined resistivity.

2. The method of claim 1 in which said vessel is oscillated in a vertical direction with respect to said narrow heated zone as it is lowered through said narrow heated zone to cause a periodic displacement of said narrow molten zone with respect to said narrow heated zone sufficient in amplitude to produce large single crystalline regions in said body.

3. The method of claim 2 in which said vessel is oscillated in a vertical direction with respect to said narrow heated zone at a rate approximately in the range of 15 to 2000 cycles per minute with a maximum peak-to-peak amplitude of 5mm.

4. The method of claim 3 in which said vessel is lowered at a rate of between approximately ¼ and 10 cm. per hour.

5. The method of claim 2 wherein said vessel is passed through said narrow heated zone several times and said vertical oscillation is imparted to said vessel during the last pass thereof through said narrow heated zone.

6. The method of claim 1 in which the temperature of said molten zone is maintained in the range of approximately 1,120° to 1,160°C, whereby a body of N-type conductivity is produced.

7. The method of claim 1 in which the temperature of said molten zone is maintained in the range of approximately 1,175°C to 1,220°C, whereby a body of P-type conductivity is produced.

8. The method of claim 1 in which said evacuated vessel is lowered in a manner that narrow molten zone traverses said body from the bottom thereof to a region adjacent the top thereof.

9. The method of claim 1 in which said narrow molten zone is caused to traverse said solid body several times.

10. The method of claim 1 in which said solid body substantially completely fills said evacuated vessel.

11. The method of claim 1 wherein said vessel is lowered at a rate of between approximately ¼ and 10 cm./hr.

* * * * *